(12) United States Patent
Nakamori et al.

(10) Patent No.: US 8,269,382 B2
(45) Date of Patent: Sep. 18, 2012

(54) COOLING STRUCTURE OF STATOR

(75) Inventors: Yukinori Nakamori, Okazaki (JP);
Satoshi Murakami, Hazu (JP);
Hirotaka Mori, Nishio (JP)

(73) Assignee: Aisin AW Co., Ltd., Anjo (JP)

( * ) Notice: Subject to any disclaimer, the term of this patent is extended or adjusted under 35 U.S.C. 154(b) by 139 days.

(21) Appl. No.: 12/964,122

(22) Filed: Dec. 9, 2010

(65) Prior Publication Data
US 2011/0181136 A1 Jul. 28, 2011

(30) Foreign Application Priority Data
Jan. 28, 2010 (JP) ................................. 2010-017026

(51) Int. Cl.
*H02K 9/00* (2006.01)
(52) U.S. Cl. ............................... 310/54; 310/52; 310/59
(58) Field of Classification Search .............. 310/52–59, 310/89, 60 A
See application file for complete search history.

(56) References Cited

U.S. PATENT DOCUMENTS

| | | | | |
|---|---|---|---|---|
| 5,633,543 A | * | 5/1997 | Jarczynski et al. | 310/59 |
| 5,670,838 A | * | 9/1997 | Everton | 310/216.061 |
| 5,808,387 A | * | 9/1998 | Akachi et al. | 310/54 |
| 6,355,995 B1 | * | 3/2002 | Jeppesen | 310/52 |
| 6,657,331 B2 | * | 12/2003 | Asao et al. | 310/54 |
| 7,545,060 B2 | * | 6/2009 | Ward | 310/54 |
| 8,169,110 B2 | * | 5/2012 | Swales et al. | 310/54 |
| 2007/0176499 A1 | * | 8/2007 | Holmes et al. | 310/54 |

FOREIGN PATENT DOCUMENTS

| | | |
|---|---|---|
| JP | A 2004-180376 | 6/2004 |
| JP | A 2005-229672 | 8/2005 |
| JP | A 2009-136070 | 6/2009 |
| JP | A-2009-254197 | 10/2009 |

OTHER PUBLICATIONS

Feb. 15, 2011 International Search Report issued in International Patent Application No. PCT/JP2010/072111 (with translation).

* cited by examiner

*Primary Examiner* — Thanh Lam
(74) *Attorney, Agent, or Firm* — Oliff & Berridge, PLC (57) ABSTRACT

A cooling structure of a stator, including a case that accommodates a rotating electrical machine, and cooling a coil end portion protruding from a stator core included in the stator of the rotating electrical machine. The structure supplies a cooling medium from the stator axial direction toward a gap that is formed between an inner surface of the case and an outer edge of the stator core. The cooling medium introducing gap is formed above a portion of the coil end portion to which the cooling medium is to be supplied. A storage space forming member is provided along an outer peripheral surface of the coil end portion. The storage space forming member has a contact portion having a first contact portion that contacts the inner surface of the case to close the cooling medium storage space on the one side in the stator axial direction.

20 Claims, 7 Drawing Sheets

COOLING STRUCTURE OF STATOR

INCORPORATION BY REFERENCE

The disclosure of Japanese Patent Application No. 2010-017026 filed on Jan. 28, 2010 including the specification, drawings and abstract is incorporated herein by reference in its entirety.

BACKGROUND OF THE INVENTION

The present invention relates to cooling structures of stators, which include a case that accommodates a rotating electrical machine, and cool a coil end portion protruding from a stator core included in the stator of the rotating electrical machine toward one side in a stator axial direction by supplying a cooling medium from the other side in the stator axial direction toward a cooling medium introducing gap that is formed between the inner surface of the case and the outer peripheral edge of one axial end face of the stator core.

DESCRIPTION OF THE RELATED ART

One conventional example of the cooling structures of the stators is a technique described in Japanese Patent Application Publication No. JP-A-2009-136070 (Paragraph [0042], FIGS. 1 to 3, and the like) below. In the structure of Japanese Patent Application Publication No. JP-A-2009-136070, as shown in FIGS. 1 to 3 thereof, a first guide 85 in a cooling medium receiving shape is formed on the inner peripheral surface of a motor case 82 at a position above the outer periphery of a coil end 63b. A cooling medium (cooling oil) supplied from an axial supply oil passage 42a flows along the inner peripheral surface of the motor case 82 and strikes the first guide 85 (see FIG. 3). Upon striking the first guide 85, the flow rate of the cooling medium decreases, and the cooling medium drops onto the coil end 63b, whereby the coil end 63b is cooled.

SUMMARY OF THE INVENTION

In the structure of Japanese Patent Application Publication No. JP-A-2009-136070, however, if cooling medium is supplied from the axial supply oil passage 42a by a large amount or at a high flow rate, the flow rate of the cooling medium may not decrease sufficiently upon striking the first guide 85, which causes the cooling medium to flow axially beyond the first guide 85 and along the inner peripheral surface of the motor case 82, and thus a sufficient amount of cooling medium may not drop onto the coil end 63b located below the first guide 85. That is, in the structure of Japanese Patent Application Publication No. JP-A-2009-136070, the coil end 63b may not be able to be efficiently cooled if the cooling medium is supplied by a large amount or at a high flow rate. Moreover, in the structure of Japanese Patent Application Publication No. JP-A-2009-136070, the cooling medium dropping from the first guide 85 does not reliably reach the same position, and the cooling medium cannot necessarily be supplied to a desired position on the coil end 63b. In this regard as well, the coil end 63b may not be able to be cooled efficiently in the structure of Japanese Patent Application Publication No. JP-A-2009-136070.

Thus, it is desired to implement cooling structures of stators, which are capable of efficiently cooling a coil end portion.

A cooling structure of a stator according to a first aspect of the present invention includes a case that accommodates a rotating electrical machine, and cools a coil end portion protruding from a stator core included in the stator of the rotating electrical machine toward one side in a stator axial direction by supplying a cooling medium from the other side in the stator axial direction toward a cooling medium introducing gap that is formed between an inner surface of the case and an outer peripheral edge of one axial end face of the stator core. In the cooling structure of the stator, the cooling medium introducing gap is formed above a portion of the coil end portion to which the cooling medium is to be supplied, a storage space forming member is provided along an outer peripheral surface of the coil end portion, the storage space forming member forming a cooling medium storage space with the inner surface of the case therebetween so that the cooling introducing gap opens in the cooling medium storage space on the other side thereof in the stator axial direction, and the storage space forming member has a contact portion having a first contact portion that contacts the inner surface of the case to close the cooling medium storage space on the one side in the stator axial direction, and a cooling medium discharge opening for supplying the cooling medium introduced into the cooling medium storage space to the coil end portion.

According to the first aspect, the cooling medium that is supplied from the other side in the stator axial direction can be introduced into the cooling medium storage space from the cooling medium introducing gap that opens in the cooling medium storage space on the other side thereof in the stator axial direction, and the cooling medium stored in this space can be supplied to the coil end portion through the cooling medium discharge opening. The cooling medium storage space is closed on the one side in the stator axial direction by the first contact portion of the contact portion of the storage space forming member. Thus, even if the cooling medium is supplied to the cooling medium introducing gap by a large amount or at a high flow rate, the possibility that the cooling medium may flow axially beyond the first contact portion is reduced, and a large proportion of the cooling medium can be stored in the cooling medium storage space. Thus, the cooling medium supplied to the cooling medium introducing gap can be efficiently supplied to the coil end portion, whereby the coil end portion can be efficiently cooled.

Further, the cooling medium supplied from the other side in the stator axial direction can be supplied to the coil end portion through the cooling medium discharge opening after being stored in the cooling medium storage space. Thus, the cooling medium can be easily supplied to a desired position on the coil end portion. In this regard as well, the coil end portion can be efficiently cooled.

Note that since the storage space forming member is positioned along the outer peripheral surface of the coil end portion, the storage space forming member can be positioned by using a gap between the coil end portion and the case. This can reduce an increase in size of the case caused by positioning the storage space forming member.

The storage space forming member may be formed so as to cover at least an uppermost portion of the coil end portion, and at least a part of the cooling medium storage space may be positioned above the uppermost portion of the coil end portion.

According to this structure, the cooling medium can be relatively easily supplied from the portion of the cooling medium storage space which is positioned above the uppermost portion of the coil end portion, to both circumferential sides of the uppermost portion of the coil end portion by using gravity. Thus, the cooling medium can be supplied to a wide circumferential range of the coil end portion by a simple structure that does not include a pump or the like.

The coil end portion may be formed in a cylindrical shape with a central axis of the coil end portion extending in the stator axial direction, and the storage space forming member may be formed in a circular arc shape as viewed from an axial direction of the coil end portion, and positioned along the outer peripheral surface of the coil end portion.

This structure is preferable in the case where the coil end portion has a cylindrical shape with its central axial extending in the stator axial direction. With this structure, the storage space forming member can be positioned by using a gap between the coil end portion and the case.

The storage space forming member may include a plurality of the cooling medium discharge openings, and the plurality of cooling medium discharge openings may be dispersed along a stator circumferential direction.

According to this structure, the cooling medium stored in the cooling medium storage space can be supplied to a plurality of circumferential positions on the coil end portion. Thus, the cooling medium can be easily supplied to a wide circumferential range of the coil end portion, which reduces the possibility that the temperature of the coil end portion may become uneven in the circumferential direction.

In the structure in which the plurality of cooling medium discharge openings are dispersed along the stator circumferential direction as described above, groove-like recessed portions, which extend in the stator axial direction, may be formed at circumferential positions where the cooling medium discharge openings are formed in an upper surface of the storage space forming member.

According to this structure, the cooling medium stored in the cooling medium storage space can be efficiently guided to the cooling medium discharge openings through the recessed portions. Thus, the cooling medium can be easily and reliably supplied to each of the plurality of cooling medium discharge openings regardless of the circumferential positions thereof. This can reduce the possibility that the cooling medium may be unevenly supplied from the plurality of cooling medium discharge openings to the coil end portion.

A direction in which the storage space forming member extends as viewed from the one side in the stator axial direction may be defined as a specific direction, and the contact portion of the storage space forming member may include at least one of a second contact portion that contacts the inner surface of the case to close the cooling medium storage space on one side in the specific direction, and a third contact portion that contacts the inner surface of the case to close the cooling medium storage space on the other side in the specific direction.

According to this structure, the cooling medium storage space is closed on at least one of the one side and the other side in the specific direction in addition to being closed on the one side in the stator axial direction. Thus, a larger proportion of the cooling medium supplied to the cooling medium introducing gap can be stored in the cooling medium storage space, whereby cooling efficiency of the coil end portion can be increased.

The contact portion of the storage space forming member may include a fourth contact portion that contacts the one axial end face of the stator core to close the cooling medium storage space on the other side in the stator axial direction.

According to this structure the cooling medium storage space is closed on the other side in the stator axial direction in addition to being closed on the one side in the stator axial direction. This can reduce the possibility that the cooling medium supplied to the cooling medium introducing gap may drop from a gap between the one axial end face of the stator core and the storage space forming member without being stored in the cooling medium storage space. Thus, a larger proportion of the cooling medium can be stored in the cooling medium storage space even if the cooling medium is supplied to the cooling medium introducing gap by a small amount or at a low flow rate.

In the structure in which the cooling medium storage space is closed on the other side in the stator axial direction as described above, the storage space forming member may be elastically deformable in the stator axial direction, and a portion of the storage space forming member on one side of the stator axial direction may be fixed to the case in a state in which the fourth contact portion located on the other side in the stator axial direction is in contact with the one axial end face of the stator core.

According to this structure, the cooling medium storage space can be reliably closed on the other side in the stator axial direction by using the elastic force of the storage space forming member. Moreover, errors regarding the attached positions of the stator core and the storage space forming member can be absorbed by elastic deformation of the storage space forming member.

A contact surface portion of the contact portion may be made of a soft material having a lower hardness than a material that forms a portion other than the contact surface portion in the storage space forming member.

According to this structure, fluid-tightness of the portion closed by the contact portion in the cooling medium storage space can be increased by fixing the storage space forming member and the stator core to the case so that the contact surface portion of the contact portion of the storage space forming member is pressed against a contacted portion.

The storage space forming member may be made of an insulating material.

According to this structure, the storage space forming member can be positioned by effectively using the existing space provided to insulate the case from the coil end portion, and also insulation properties between the case and the coil end portion can be increased.

DETAILED DESCRIPTION OF THE EMBODIMENTS

Figure 1:
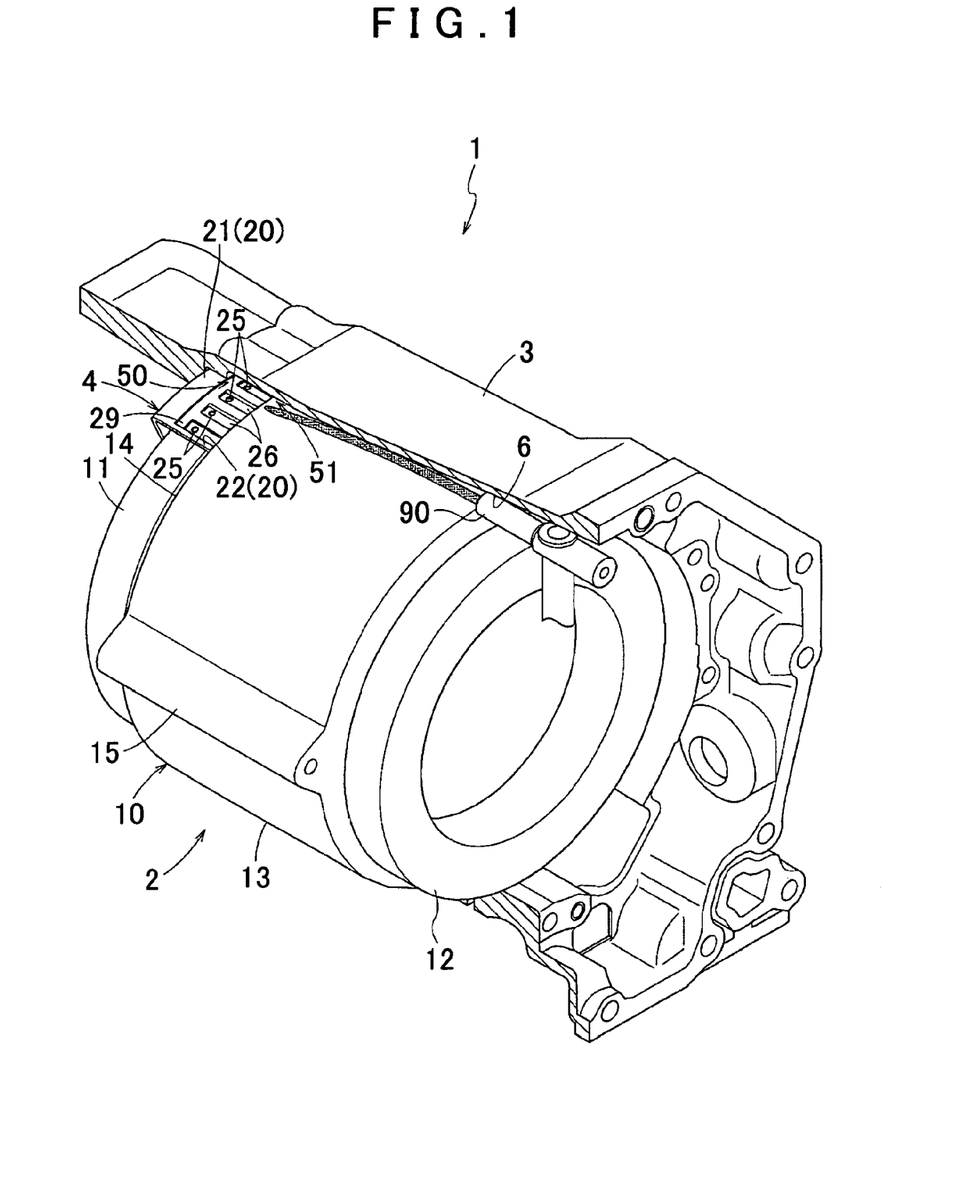
FIG. 1 is a partial cross-sectional perspective view of a drive device according to an embodiment of the present invention.

An embodiment of a cooling structure of a stator according to the present invention will be described with reference to the accompanying drawings. The embodiment is described with respect to an example in which the present invention is applied to a stator of a rotating electrical machine included in a drive device for vehicles. As shown in FIG. 1, the cooling structure of the stator of the present embodiment is characterized by including a storage space forming member 4 for forming a cooling medium storage space 50 between the storage space forming member 4 and an inner surface 6 of a case 3. Providing such a storage space forming member 4 enables a coil end portion 11 to be efficiently cooled. The cooling structure of the stator of the present embodiment will be described in detail below in the order of "General Structure of Drive Device" and "Structure of Storage Space Forming Member."

Note that in the following description, the "axial direction," the "circumferential direction," and the "radial direction" are defined based on the central axis of a stator 10 (a rotating electrical machine 2) unless otherwise mentioned. In the following description, "one axial side" indicates the upper left side along the axial direction in FIG. 1 (the right side in FIG. 4), and the "other axial side" indicates the lower right side along the axial direction in FIG. 1 (the left side in FIG. 4), unless otherwise mentioned. Moreover, in the following description, "one circumferential side" indicates the counter-clockwise side in FIG. 2, and the "other circumferential side" indicates the clockwise side in FIG. 2, unless otherwise mentioned.

In the following description, arrangements of members and positional relations between different members are described based on the directions in the state in which the stator 10 is used, unless otherwise mentioned. Thus, "upper" indicates the vertical upper side in the state in which the stator 10 is used, and "lower" indicates the vertical lower side in the state in which the stator 10 is used. Note that the up/down direction in FIG. 2 matches the up/down direction (the vertical direction) in the state in which the stator 10 is used. For example, in the case where the stator 10 is a stator for a rotating electrical machine as a driving force source of a vehicle such as a hybrid vehicle or an electric vehicle, the state in which the stator 10 is mounted corresponds to the state in which the stator is used.

1. General Structure of Drive Device

The general structure of a drive device 1 of the present embodiment will be described below with reference to FIGS. 1 and 2. The drive device 1 of the present embodiment is a drive device for a vehicle (not shown), and includes a rotating electrical machine 2 as a driving force source, and a case 3 that accommodates the rotating electrical machine 2.

1-1. Structure of Rotating Electrical Machine

Figure 4:
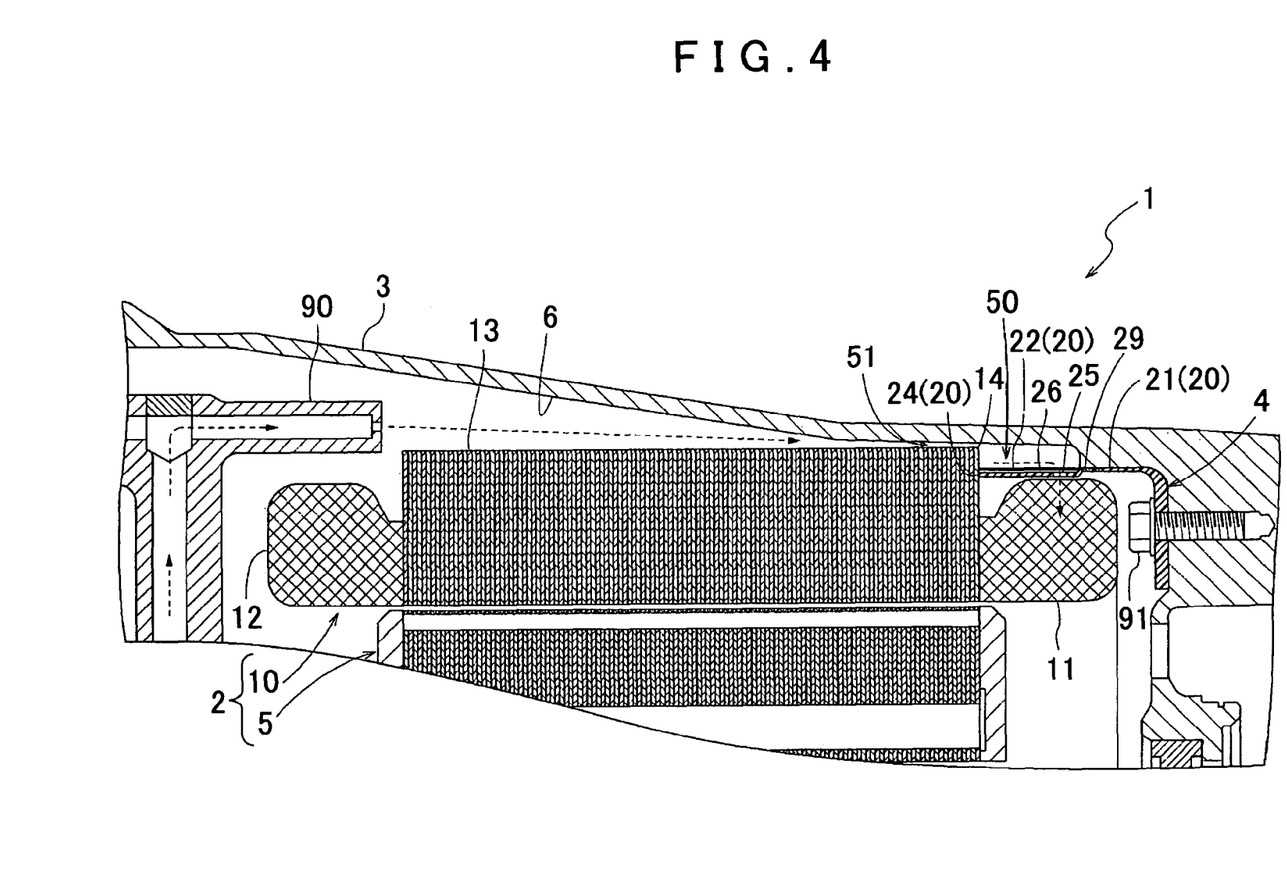
FIG. 4 is a partial cross-sectional view of the drive device according to the embodiment of the present invention.

The rotating electrical machine 2 includes a stator 10 and a rotor 5 (see FIG. 4). Note that in the specification, the term "rotating electrical machine" is used as a concept including a motor (an electrical motor), a generator (an electrical generator), and a motor-generator that functions both as a motor and a generator as required. The vehicle can be, e.g., a hybrid vehicle or an electric vehicle.

The stator 10 includes a stator core 13 and coil end portions 11, 12. The stator core 13 includes a cylindrical core main body portion, and ridge portions 15 formed so as to protrude radially outward from the outer peripheral surface of the core main body portion, and has a cylindrical overall shape. Note that the ridge portions 15 are formed along the entire axial length of the stator core 13, and formed at positions that equally divide the circumference of the core main body portion into three parts (see FIG. 2). The stator core 13 is fixedly fastened to the case 3 by fastening bolts 95 that are inserted through insertion holes formed in the ridge portions 15.

A plurality of teeth (not shown) are formed radially inside the stator core 13 at predetermined intervals along the circumferential direction, and slots (not shown) extending in an axial direction and a radial direction are formed between circumferentially adjacent ones of the teeth. The plurality of slots formed along the circumferential direction have the same cross-sectional shape, have a predetermined width and a predetermined depth, and are open radially inward. The coil end portions that protrude from axial ends of the stator core 13 are formed by coils (not shown) wound in the slots. In this example, as shown in FIG. 1, the coil end portions are formed on both axial sides of the stator core 13. In the following description, reference character "11" represents the coil end portion on the one axial side, and reference character "12" represents the coil end portion on the other axial side. In the present embodiment, the coil end portion 11 on the one axial side is a coil end portion to be cooled by using a storage space forming member 4 described later.

The coil end portion 11 has a cylindrical shape with its central axis extending axially. Note that although FIG. 1 schematically shows a cylindrical space that is occupied by the cylindrical coil end portion 11, the coils in this space can be formed in any shape. The same applies to the coil end portion 12.

The rotor 5 (see FIG. 4) including a permanent magnet and an electromagnet is positioned radially inside the stator 10 (the stator core 13) so as to be rotatable with respect to the stator 10. That is, the rotating electrical machine 2 of the present embodiment is an inner rotor type rotating electrical machine.

Figure 5A:
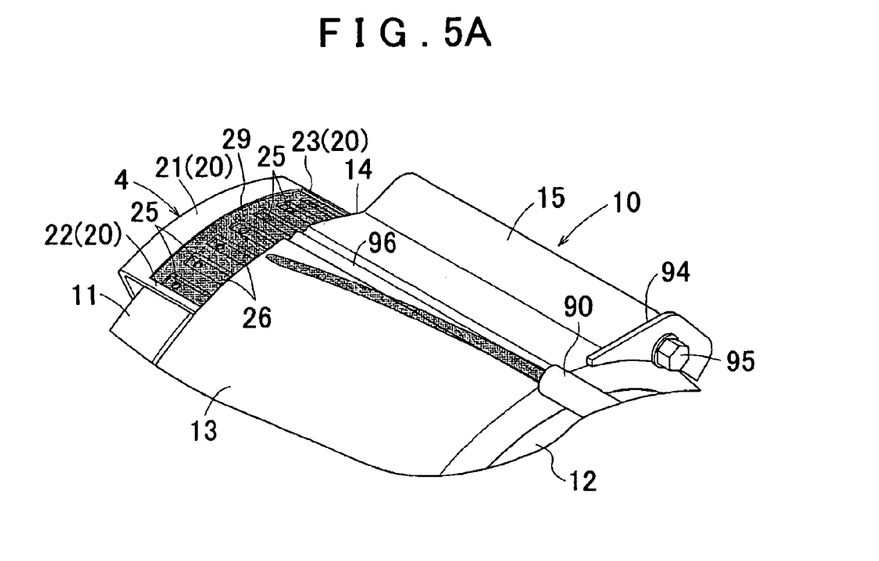
FIGS. 5A and 5B are diagrams conceptually showing cooling medium distributions in a cooling structure of a stator according to the embodiment of the present invention.
Figure 5B:
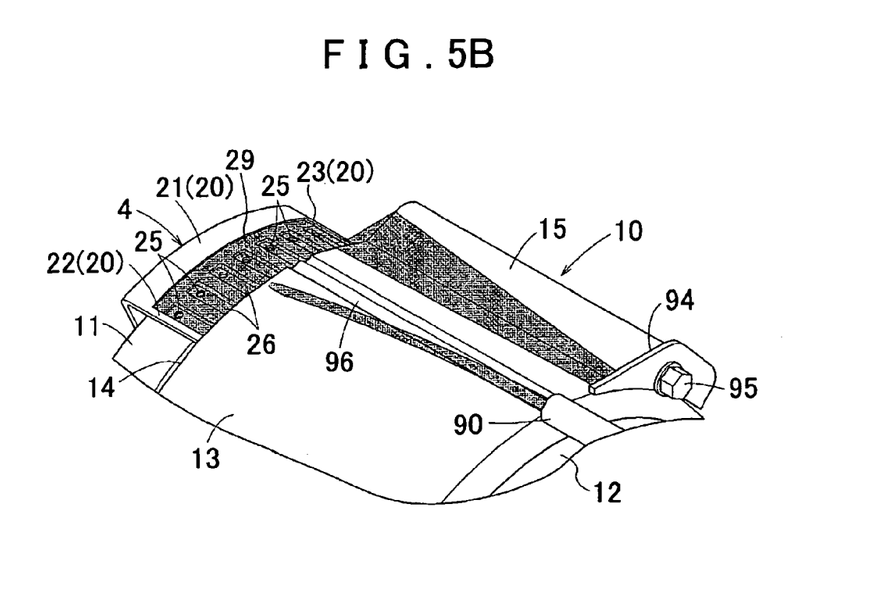

Note that in the present embodiment, the stator core 13 and a rotor core are laminated structures in which a plurality of annular electromagnetic steel plates are laminated together. Thus, as shown in FIGS. 2 and 5, welding grooves 96 for welding the laminated electromagnetic steel plates together are formed along the entire axial length of the stator core 13 in the outer peripheral surface of the stator core 13. Note that at least one of the stator core 13 and the rotor core may be formed as a member that contains as a main component a pressed powder material that is formed by pressure forming magnetic powder, namely powder of a magnetic material.

1-2. Structure of Case

The case 3 is a member that accommodates the rotating electrical machine 2. In the present embodiment, as shown in FIGS. 1 and 4, the case 3 includes a peripheral wall that covers the rotating electrical machine from radially outside, and the peripheral wall is formed so that the overall diameter of the peripheral wall decreases toward the one axial side. In the state in which the case 3 is fixed to the vehicle, the central axis of the rotating electrical machine 2 accommodated in the case 3 extends in a direction that crosses the vertical direction (hereinafter simply referred to as the "vertical cross direction"), and the outer peripheral surface of the stator core 13 faces an inner surface 6 of the case 3. Note that although the vertical cross direction is defined as a direction that matches the horizontal direction in the present embodiment, the vertical cross direction may be other direction than the horizontal direction that crosses the vertical direction. For example, the vertical cross direction may be a direction that extends in the longitudinal direction of the vehicle and extends vertically downward toward the rear side of the vehicle.

As shown in FIG. 1, in the present embodiment, the case 3 has a connection portion with other case or a cover on the other axial side of the rotating electrical machine 2, and may be structured to include, e.g., other rotating electrical machine or a gear system (a differential gear unit or the like) near the connection portion or on the other axial side of the connection portion. The case 3 may be structured to include, e.g., a transmission device on one axial side of the rotating electrical machine 2. Note that the shape of the case 3 may be changed as appropriate.

1-3. Cooling Mechanism of Stator

As shown in FIG. 1, the drive device 1 of the present embodiment includes a cooling medium discharge portion 90 inside the case 3. In a cooling structure of the stator 10 of the present embodiment, a cooling medium discharged from the cooling medium discharge portion 90 is supplied to the coil end portion 11 to cool the coil end portion 11. Note that various known coolants such as oil can be used as the cooling medium.

Specifically, the cooling medium is pressure-fed from, e.g., a mechanical oil pump and an electric oil pump (both not shown) to the cooling medium discharge portion 90. The cooling medium is discharged from the cooling medium discharge portion 90 toward the one axial side, and as conceptually shown in FIG. 1, the discharged cooling medium is supplied to a cooling medium introducing gap 51 that is formed between the inner surface 6 of the case 3 and an outer peripheral edge 14 of the one axial end face of the stator core 13. That is, the cooling medium is supplied from the other axial side to the cooling medium introducing gap 51. Note that the cooling medium discharged from the cooling medium discharge portion 90 either directly reaches the cooling medium introducing gap 51, or flows along the inner surface 6 of the case 3 and the outer peripheral surface of the stator core 13 and reaches the cooling medium introducing gap 51.

A cooling medium storage space 50, which communicates with the cooling medium introducing gap 51, is formed on one axial side of the cooling medium introducing gap 51. The cooling medium supplied to the cooling medium introducing gap 51 is introduced into the cooling medium storage space 50 through the cooling medium introducing gap 51 formed on the other axial side of the cooling medium storage space 50, and is then supplied to the coil end portion 11 through cooling medium discharge openings 25 formed in the storage space forming member 4. The cooling medium supplied to the coil end portion 11 cools the coil end portion 11 by heat exchange with the coil end portion 11. Note that the cooling medium storage space 50 is a space formed between the inner surface 6 of the case 3 and the storage space forming member 4. The structure of the storage space forming member 4 will be described in detail later.

In the present embodiment, as shown in FIG. 1, the cooling medium discharge portion 90 is provided near the coil end portion 12 located on the other axial side. As described above, the peripheral wall of the case 3, which covers the rotating electrical machine 2 from radially outside, is formed so that the overall diameter of the peripheral wall decreases toward the one axial side. Thus, there is only a limited space near the coil end portion 11 located on the one axial side, and it is difficult to place a member like the cooling medium discharge portion 90 in this limited space. In the present invention, since the storage space forming member 4, which is described later, is provided, the coil end portion 11 can be efficiently cooled even though the cooling medium discharge portion 90 is provided near the coil end portion 12 located on the other axial side.

Note that in the present invention, the structure for supplying the cooling medium from the other axial side to the cooling medium introducing gap 51 is not limited to the cooling medium discharge portion 90 shown in FIG. 1, and the structure for discharging the cooling medium can be changed as appropriate as long as the cooling medium can be supplied from the other axial side to the cooling medium introducing gap 51. It should be understood that, in this case, the position of the structure for discharging the cooling medium, and the direction in which the cooling medium is discharged can also be changed accordingly.

2. Structure of Storage Space Forming Member

The structure of the storage space forming member 4 will be described in detail below. As shown in FIG. 1, the storage space forming member 4 is a member for forming, between the storage space forming member 4 and the inner surface 6 of the case 3, the cooling medium storage space 50 into which the cooling medium introducing gap 51 opens and that is formed on the other axial side thereof. Note that as described above, the cooling medium introducing gap 51 is a gap fowled between the inner surface 6 of the case 3 and the outer peripheral edge 14 of the one axial end face of the stator core 13, and is formed above a portion of the coil end portion 11 to which the cooling medium is to be supplied. As used herein, the "portion of the coil end portion 11 to which the cooling medium is to be supplied" indicates a portion of the coil end portion 11 to which the cooling medium is directly supplied from the storage space forming member 4 (to be exact, the cooling medium discharge openings 25 described later), and in this example, is a region including the uppermost portion of the coil end portion 11. The expression "above the portion to which the cooling medium is to be supplied" means "a vertical position being on an upper side of the portion to which the cooling medium is to be supplied." Thus, the cooling medium introducing gap 51 needs not necessarily overlap the portion to which the cooling medium is to be supplied, as viewed vertically.

In the present embodiment, the storage space forming member 4 is made of an insulating material (e.g., a resin). This enables the storage space forming member 4 to be positioned near the coil end portion 11 by effectively using the existing space for providing insulation between the case 3 and the coil end portion 11, and also enables insulation properties between the case 3 and the coil end portion 11 to be increased. This structure is suitable for the case where there is only a limited space near the coil end portion 11 in the case 3 as in the present embodiment.

Specifically, as shown in FIGS. 1 and 4, the storage space forming member 4 is positioned near the coil end portion 11 and along the outer peripheral surface of the coil end portion 11. Note that as described above, the coil end portion 11 has a cylindrical shape whose central axis extends axially. As shown in FIG. 2, according to such a shape of the coil end portion 11, the storage space forming member 4 has a circular arc shape as viewed in the axial direction of the coil end portion 11, and is formed so as to cover at least the uppermost portion of the coil end portion 11. Thus, at least a part of the cooling medium storage space 50 is positioned above the uppermost portion of the coil end portion 11 so as to overlap the uppermost portion of the coil end portion 11 as viewed vertically. Note that the "outer peripheral surface of the coil end portion 11" is a radially outer peripheral surface (a cylindrical surface) of the cylindrical coil end portion 11, and more specifically, a surface along a radially outermost portion (end face) of the coils of the coil end portion 11.

Figure 2:
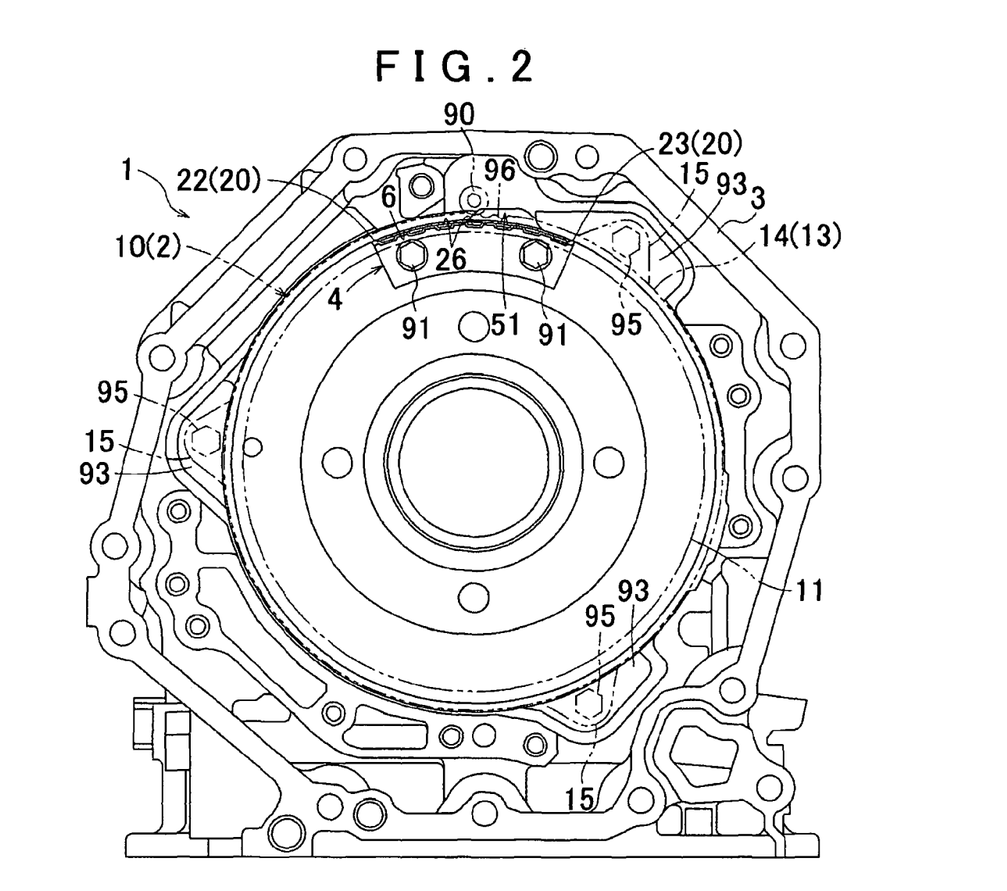
FIG. 2 is a diagram of the drive device according to the embodiment of the present invention as viewed axially.
Figure 3:
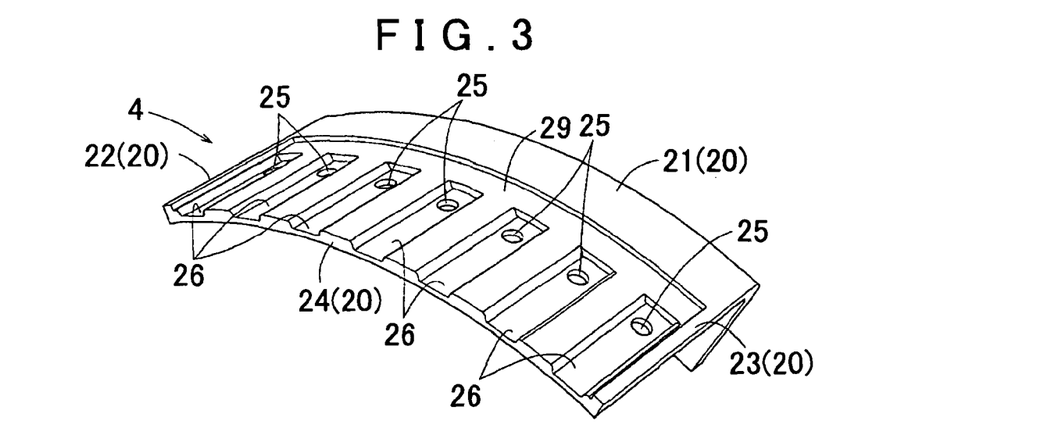
FIG. 3 is a perspective view of a storage space forming member according to the embodiment of the present invention.

As shown in FIG. 3, the storage space forming member 4 includes a plurality of (in this example, seven) cooling medium discharge openings 25 for supplying the cooling medium introduced into the cooling medium storage space 50 to the coil end portion 11. Specifically, the plurality of cooling medium discharge openings 25 are formed in a recess 29 that is recessed radially inward in the storage space forming member 4. The plurality of cooling medium discharge openings 25 are dispersed along the circumferential direction. Specifically, as shown in FIG. 2, one of the cooling medium discharge openings 25 is positioned above the uppermost portion of the coil end portion 11, and the remaining cooling medium discharge openings 25 are positioned on both circumferential sides of the one cooling medium discharge opening 25. Thus, the cooling medium that is stored in the cooling medium storage space 50 can be supplied to the uppermost portion of the coil end portion 11 and the plurality of positions on both circumferential sides of the uppermost portion of the coil end portion 11, whereby the cooling medium can be supplied to a wide circumferential range of the coil end portion 11.

The plurality of cooling medium discharge openings 25 are formed at the same axial position. Note that it is preferable that the cooling medium discharge openings 25 be axially positioned so as to overlap the coil end portion 11 as viewed vertically. In this example, as shown in FIG. 4, the cooling medium discharge openings 25 is axially positioned near the axial central position of the coil end portion 11. This enables the coil end portion 11 to be efficiently cooled by the cooling medium discharged from the cooling medium discharge openings 25. Note that in this example, the plurality of cooling medium discharge openings 25 have a circular cross section, and have the same opening cross-sectional area.

With the above structure, the cooling medium supplied from the other axial side to the cooling medium introducing gap 51 can be supplied to the coil end portion 11 through the cooling medium discharge openings 25 after being stored in the cooling medium storage space 50, whereby the cooling medium can be easily supplied to a desired position on the coil end portion 11. It is to be understood that the number of cooling medium discharge openings 25 in the storage space forming member 4, and the circumferential and axial positions of the cooling medium discharge openings 25 can be changed as appropriate according to the temperature distribution in the coil end portion 11, the shape of the coils of the coil end portion 11, and the like. For example, the cooling medium discharge openings 25 can be dispersed along the axial direction in addition to the circumferential direction, or can be dispersed only along the axial direction.

In the present embodiment, in order to reliably supply the cooling medium to each of the cooling medium discharge openings 25, groove-like axial recessed portions 26 are formed at all of the circumferential positions of the cooling medium discharge openings 25 in the upper surface of the storage space forming member 4 (in this example, the upper surface of the recess 29). This enables the cooling medium stored in the cooling medium storage space 50 to be efficiently guided to the cooling medium discharge openings 25 through the recessed portions 26. Thus, the cooling medium can be reliably supplied to each of the plurality of cooling medium discharge openings 25 regardless of the circumferential positions of the cooling medium discharge openings 25, which reduces the possibility that the cooling medium may be unevenly supplied from the plurality of cooling medium discharge openings 25 to the coil end portion 11.

Note that as shown in FIG. 4, the storage space forming member 4 has an L-shaped cross section as taken along the radial direction, and is structured so that a portion extending axially and a portion extending in a direction perpendicular to the axial direction are connected together by a bent portion. Note that the axially extending portion of the storage space forming member 4 is a portion positioned above the outer peripheral surface of the coil end portion 11. The storage space forming member 4 is fixedly fastened to a wall (e.g., a terminal end wall and an intermediate wall) of the case 3 by fastening bolts 91 that are inserted through insertion holes formed in the portion extending in the direction perpendicular to the axial direction (the portion located on the one axial side). In the present embodiment, the storage space forming member 4 is formed so as to have uniform hardness.

As shown in FIG. 3, the storage space forming member 4 has a contact portion 20 for closing the cooling medium storage space 50, in order to enable a large proportion of the cooling medium supplied from the other axial side to the cooling medium introducing gap 51 to be stored in the cooling medium storage space 50. By providing such a contact portion 20, a large proportion of the cooling medium can be stored in the cooling medium storage space 50 even if a large amount of cooling medium is supplied to the cooling medium introducing gap 51, and the cooling medium is supplied to the cooling medium introducing gap 51 at a high flow rate, as described below. Thus, the coil end portion 11 can be efficiently cooled by using the cooling medium supplied to the cooling medium introducing gap 51.

Specifically, the contact portion 20 of the storage space forming member 4 has at least a first contact portion 21, and in the present embodiment, further has a second contact portion 22, a third contact portion 23, and a fourth contact portion 24. As shown in FIG. 4, the first contact portion 21 is a portion that contacts the inner surface 6 of the case 3 to close one axial side of the cooling medium storage space 50. That is, the first contact portion 21 is a portion that contacts the inner surface 6 of the case 3 on the one axial side of the cooling medium storage space 50. As shown in FIG. 3, the first contact portion 21 is formed on one axial side of the recess 29 in the storage space forming member 4, and the upper surface of the first contact portion 21 is located radially outside the upper surface of the recess 29. The upper surface of the first contact portion 21 is a radially outer surface of the first contact portion 21. Note that as can be seen from the cross-sectional view taken along the radial direction shown in FIG. 4, the first contact portion 21 is located radially inside the outer peripheral surface of the stator core 13. In view of this positional relation, the inner surface 6 of the case 3 has a stepped portion that is stepped radially inward on one axial side of the outer peripheral edge 14 of the one axial end face of the stator core 13, so that the first contact portion 21 can contact the inner surface 6 of the case 3. Note that although detailed description of the shape of the inner surface 6 of the case 3 is omitted, in this example, the first contact portion 21 contacts the inner surface 6 of the case 3 along the entire circumferential width of the storage space forming member 4, and thus, the one axial side of the cooling medium storage space 50 is closed.

As shown in FIG. 2, the second contact portion 22 is a portion that contacts the inner surface 6 of the case 3 to close the cooling medium storage space 50 on one side in a specific direction. That is, the second contact portion 22 is a portion that contacts the inner surface 6 of the case 3 on the one side in the specific direction of the cooling medium storage space 50. As used herein, the "specific direction" is a direction in which the storage space forming member 4 (in this example, the axially extending portion of the storage space forming member 4) extends as viewed axially (as viewed from any of the sides of the axial direction), and in this example, matches the circumferential direction. As shown in FIG. 3, the second contact portion 22 is formed on the one side in the specific direction (the circumferential direction) of the recess 29 in the storage space forming member 4, and the upper surface of the second contact portion 22 is located at the same radial position as that of the upper surface of the first contact portion 21. The upper surface of the second contact portion 22 is a radially outer surface of the second contact portion 22. Note that although detailed description of the shape of the inner surface 6 of the case 3 is omitted, in this example, the second contact portion 22 contacts the inner surface 6 of the case 3 along the entire axial length of the storage space forming member 4, and thus, the cooling medium storage space 50 is closed on the one side in the specific direction (the circumferential direction).

As shown in FIG. 2, the third contact portion 23 is a portion that contacts the inner surface 6 of the case 3 to close the cooling medium storage space 50 on the other side in the specific direction (the circumferential direction). That is, the third contact portion 23 is a portion that contacts the inner surface 6 of the case 3 on the other side in the specific direction of the cooling medium storage space 50. As shown in FIG. 3, the third contact portion 23 is formed on the other side in the specific direction (the circumferential direction) of the recess 29 in the storage space forming member 4, and the upper surface of the third contact portion 23, which is a radially outer surface, is located at the same radial position as that of the upper surface of the first contact portion 21. That is, in this example, the upper surfaces of the first contact portion 21, the second contact portion 22, and the third contact portion 23 are located at the same radial position. Note that although detailed description of the shape of the inner surface 6 of the case 3 is omitted, in this example, the third contact portion 23 contacts the inner surface 6 of the case 3 along the entire axial length of the storage space forming member 4, and thus, the cooling medium storage space 50 is closed on the other side in the specific direction (the circumferential direction).

As shown in FIG. 4, the fourth contact portion 24 is a portion that contacts the one axial end face of the stator core 13 to close the other axial side of the cooling medium storage space 50. That is, the fourth contact portion 24 is a portion that contacts, on the other axial side of the cooling medium storage space 50, the one axial end face of the stator core 13. As shown in FIG. 3, the fourth contact portion 24 is formed on the other axial side of the recess 29 in the storage space forming member 4, and includes a surface facing the other axial side. In this example, the fourth contact portion 24 contacts the one axial end face of the stator core 13 along the entire circumferential width of the storage space forming member 4, and thus, the other axial side of the cooling medium storage space 50 is closed except the portion where the cooling medium introducing gap 51 is formed.

As described above, in the present embodiment, the cooling medium storage space 50 is a space from which the cooling medium is less likely to leak to the outside, except at the positions where the cooling medium introducing gap 51 and the cooling medium discharge openings 25 are formed. Thus, even if a large amount of cooling medium is supplied to the cooling medium introducing gap 51, or the cooling medium is supplied to the cooling medium introducing gap 51 at a high flow rate, a large proportion of the cooling medium can be stored in the cooling medium storage space 50, and the coil end portion 11 can be efficiently cooled by using the cooling medium supplied to the cooling medium introducing gap 51. Moreover, even if a small amount of cooling medium is supplied to the cooling medium introducing gap 51, or the cooling medium is supplied to the cooling medium introducing gap 51 at a low flow rate, the possibility that the cooling medium supplied to the cooling medium introducing gap 51 may drop from a gap between the side surface located on one axial side of the stator core 13 and the storage space forming member 4 can be reduced, whereby a high proportion of the cooling medium can be stored in the cooling medium storage space 50.

As described above, the cooling medium storage space 50 is a space from which the cooling medium is less likely to leak to the outside, except at the positions where the cooling medium introducing gap 51 and the cooling medium discharge openings 25 are formed. Thus, the operating state is switched between the state in which the coil end portion 11 is mainly cooled, and the state in which both the coil end portion 11 and the stator core 13 are actively cooled, depending on the amount of cooling medium supplied from the cooling medium discharge portion 90 to the cooling medium introducing gap 51. This will be described below with reference to FIGS. 5A and 5B.

FIG. 5A conceptually shows a cooling medium distribution in the state (hereinafter referred to as the "first supply state") in which the amount of cooling medium that is supplied per unit time from the cooling medium discharge portion 90 to the cooling medium storage space 50 through the cooling medium introducing gap 51 is smaller than that of cooling medium that is discharged per unit time from all the cooling medium discharge openings 25. In the first supply state, most of the cooling medium supplied from the cooling medium discharge portion 90 is supplied to the coil end portion 11 through the cooling medium discharge openings 25 to cool the coil end portion 11. Note that the stator core 13 can be cooled by the cooling medium, for example, when the cooling medium discharged from the cooling medium discharge portion 90 contacts the upper surface of the stator core 13 in the process of flowing from the cooling medium discharge portion 90 to the cooling medium introducing gap 51. However, the coil end portion 11 is mainly cooled in the first supply state.

FIG. 5B conceptually shows a cooling medium distribution in the state (hereinafter referred to as the "second supply state") in which the amount of cooling medium that is supplied per unit time from the cooling medium discharge portion 90 to the cooling medium storage space 50 through the cooling medium introducing gap 51 is larger than that of cooling medium that is discharged per unit time from all the cooling medium discharge openings 25. In the second supply state, the cooling medium overflows from the cooling medium storage space 50 as the entire amount of the cooling medium supplied from the cooling medium discharge portion 90 cannot be supplied to the coil end portion 11 through the cooling medium discharge openings 25. As described above, the cooling medium storage space 50 is a space from which the cooling medium is less likely to leak to the outside, except at the positions where the cooling medium introducing gap 51 and the cooling medium discharge openings 25 are formed. Thus, the cooling medium overflowing from the cooling medium storage space 50 flows toward the outer peripheral surface of the stator core 13 at this time. Accordingly, in the second supply state, the cooling medium is supplied also to the outer peripheral surface of the stator core 13, and both the coil end portion 11 and the stator core 13 are actively cooled.

As shown in FIGS. 5A and 5B, a sealing member 94 is attached to the other axial end of each ridge portion 15, and one axial end of each ridge portion 15 is in contact with a seat 93 (not shown in FIGS. 5A and 5B, see FIG. 2). The upper end of the sealing member 94 and the upper end of the seat 93 are positioned higher than a horizontal plane that extends on the uppermost portion of the ridge portion 15. Thus, the cooling medium that overflows the cooling medium storage space 50 and is supplied to the outer peripheral surface of the stator core 13 tends to flow beyond the ridge portion 15 and to be supplied also to the outer peripheral surface of the stator core 13 located below the ridge portion 15. Accordingly, a high proportion of the cooling medium that overflows the cooling medium storage space 50 can be used to cool the stator core 13.

For example, the amount of cooling medium that is discharged from the cooling medium discharge portion 90 may be varied so that the first supply state is established when the rotating electrical machine 2 rotates at a low speed, and the second supply state is established when the rotating electrical machine 2 rotates at a high speed. In this case, a structure can be implemented in which the coil end portion 11 is mainly cooled when the rotating electrical machine 2 rotates at a low speed and the ratio of iron loss to total loss is low, and the outer peripheral surface of the stator core 13 is also actively cooled when the rotating electrical machine 2 rotates at a high speed and the ratio of iron loss to total loss is high.

3. Other Embodiments

Other embodiments of the present invention will be described below. Note that it is not intended that characteristic features disclosed in each of the following embodiments be able to be used only in that embodiment, and such characteristic features can be applied to other embodiments unless inconsistencies arise.

Figure 6:
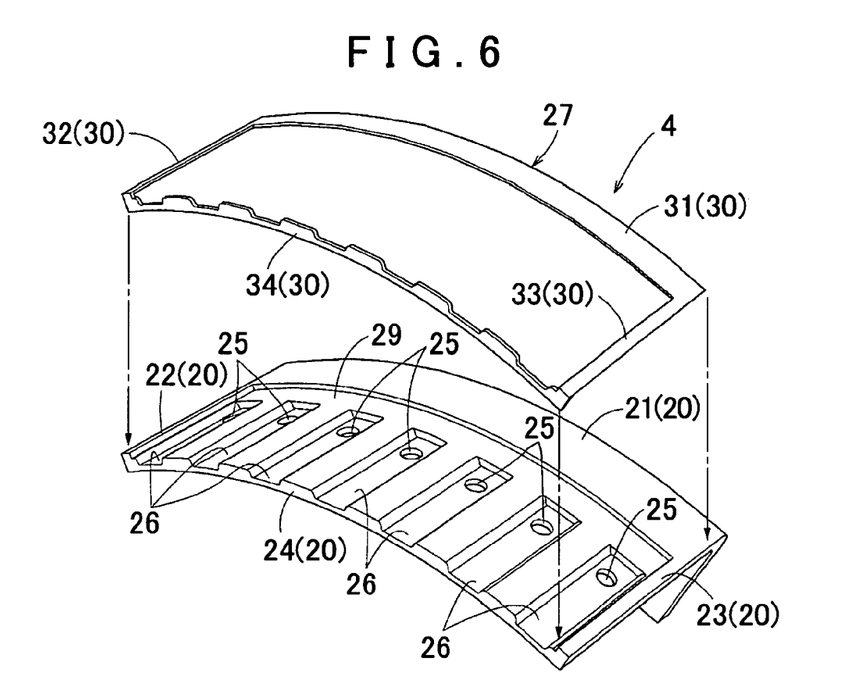
FIG. 6 is an exploded perspective view of a storage space forming member according to other embodiment of the present invention.
Figure 7:
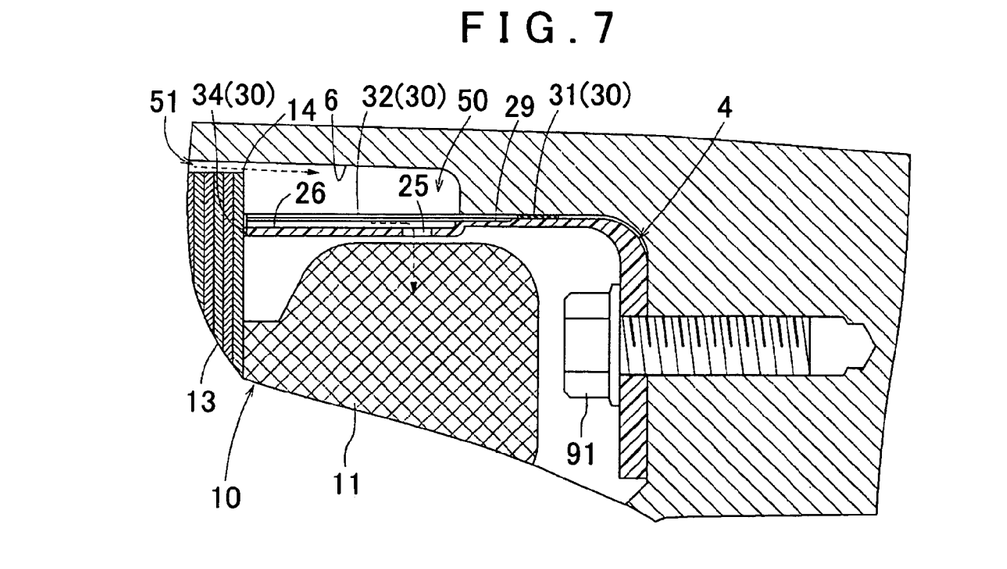
FIG. 7 is a partial cross-sectional view of a drive device according to the other embodiment of the present invention.

(1) The above embodiment is described with respect to an example in which the storage space forming member 4 has uniform hardness. However, embodiments of the present invention are not limited to this. For example, it is also one of preferred embodiments of the present invention that the contact surface portion of the contact portion 20 of the storage space forming member 4 is made of a soft material having a lower hardness than any material that forms the portions other than the contact surface portion in the storage space forming member 4. As this structure, for example, as shown in FIGS. 6 and 7, the storage space forming member 4 may include a soft member 27 that is attached to the surface of the contact portion 20, and the contact surface portion of the contact portion 20 may be formed by the soft member 27. This soft member 27 includes, as a contact surface portion 30, a first contact surface portion 31, a second contact surface portion 32, a third contact surface portion 33, and a fourth contact surface portion 34. The first contact surface portion 31 serves as a contact surface portion of the first contact portion 21, the second contact surface portion 32 serves as a contact surface portion of the second contact portion 22, the third contact surface portion 33 serves as a contact surface portion of the third contact portion 23, and the fourth contact surface portion 34 serves as a contact surface portion of the fourth contact portion 24. According to this structure, the fluid-tightness of the portion closed by the contact portion 20 in the cooling medium storage space 50 can be increased by fixing the storage space forming member 4 and the stator core 13 to the case 3 so that the contact surface portion 30 for the contact portion 20 of the storage space forming member 4 is pressed against the contacted portion (the case 3 and the one axial end face of the stator core 13). Note that not all of the contact surface portions of the first contact portion 21, the second contact portion 22, the third contact portion 23, and the fourth contact portion 24 of the contact portion 20 in the storage space forming member 4 need necessarily be made of the soft material having a lower hardness, and the contact surface portion of only a part of the contact portions may be made of the soft material having a lower hardness.

Figure 8:
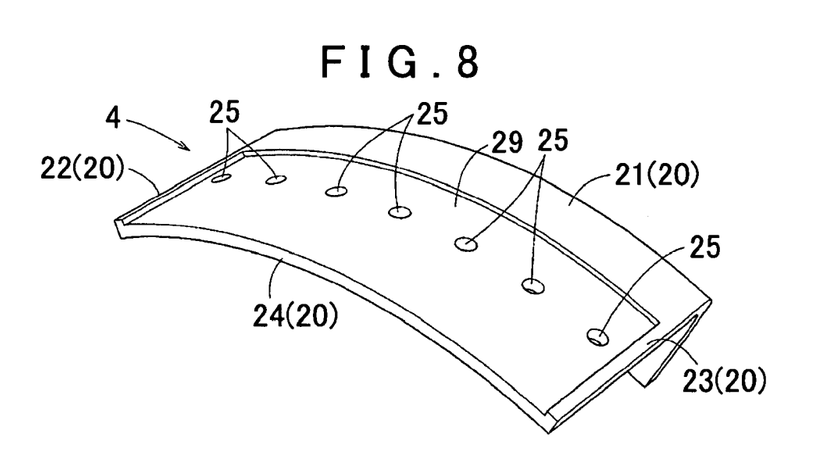
FIG. 8 is a perspective view of a storage space forming member according to a further embodiment of the present invention.

(2) The above embodiment is described with respect to an example in which the groove-like axial recessed portions 26 are formed at all the circumferential positions where the cooling medium discharge openings 25 are formed in the upper surface of the storage space forming member 4. However, embodiments of the present invention are not limited to this. For example, as shown in FIG. 8, it is also one of preferred embodiments of the present invention that no recessed portion 26 is formed in the upper surface of the storage space forming member 4, and the cooling medium discharge openings 25 are formed directly in the recess 29. The groove-like axial recessed portion 26 may be formed at a part of the circumferential positions where the cooling medium discharge openings 25 are formed in the upper surface of the storage space forming member 4. For example, the groove-like axial recessed portion 26 may be formed only at one or more (e.g., three) positions located in the middle in the circumferential direction, out of the circumferential positions where the cooling medium discharge openings 25 are formed in the upper surface of the storage space forming member 4.

Figure 9:
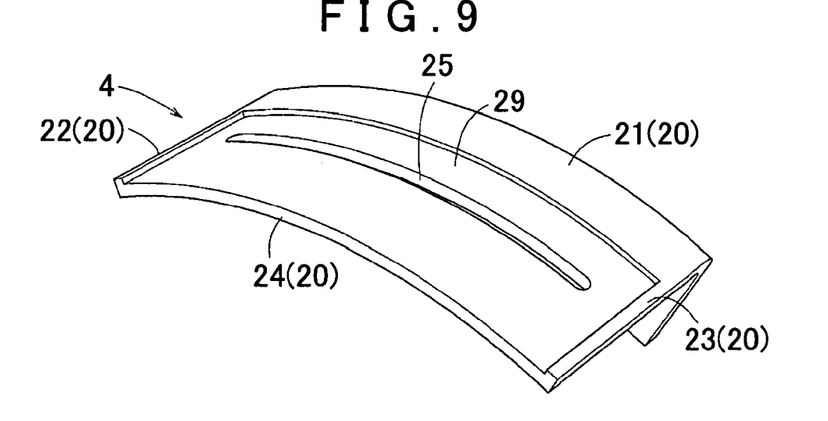
FIG. 9 is a perspective view of a storage space forming member according to a further embodiment of the present invention.

(3) The above embodiment is described with respect to an example in which the storage space forming member 4 includes a plurality of cooling medium discharge openings 25. However, embodiments of the present invention are not limited to this, and it is also one of preferred embodiments of the present invention that the storage space forming member 4 includes a single cooling medium discharge opening 25. In this case, for example, as shown in FIG. 9, the single cooling medium discharge opening 25 may be formed as a long hole extending in the circumferential direction. With this structure, the cooling medium can be supplied to a wide circumferential range of the coil end portion 11 as in the above embodiment.

Figure 10:
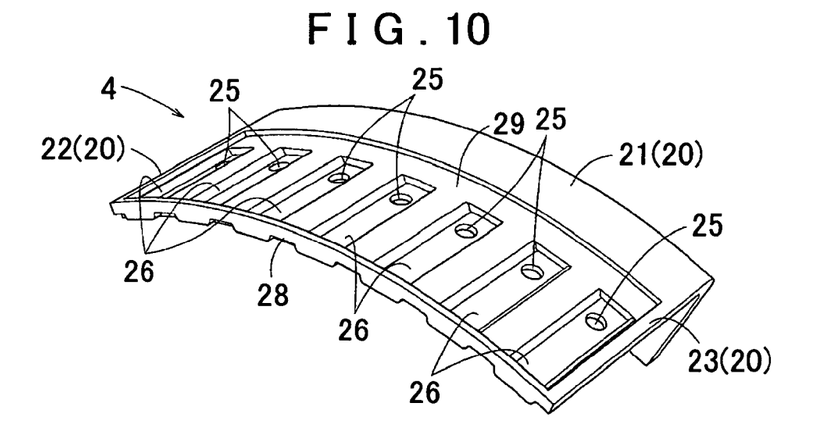
FIG. 10 is a perspective view of a storage space forming member according to a further embodiment of the present invention.

(4) The above embodiment is described with respect to an example in which the contact portion 20 of the storage space forming member 4 includes the fourth contact portion 24 that contacts the one axial end face of the stator core 13 to close the other axial side of the cooling medium storage space 50. However, embodiments of the present invention are not limited to this. It is also one of preferred embodiments of the present invention that the contact portion 20 of the storage space forming member 4 includes no portion that contacts the one axial end face of the stator core 13, and a gap is formed between the one axial end face of the stator core 13 and the storage space forming member 4. In this structure, the storage space forming member 4 may be formed, for example, as shown in FIG. 10. In the structure of FIG. 10, the storage space forming member 4 includes an end wall 28 on the other axial side, which reduces the possibility that the cooling medium supplied to the recess 29 may leak from the other axial side without being discharged from the cooling medium discharge openings 25. Note that in the example of FIG. 10, the upper surface (the surface facing radially outside) of the end wall 28 is located at the same radial position as that of the upper surfaces of the first contact portion 21, the second contact portion 22, and the third contact portion 23.

Figure 11:
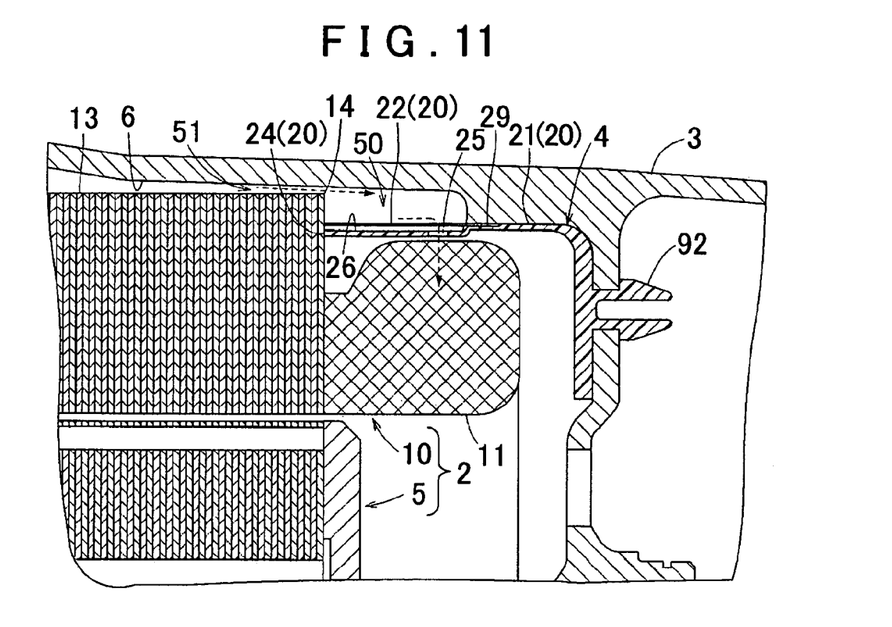
FIG. 11 is a partial cross-sectional view of a drive device according to a further embodiment of the present invention.

(5) The above embodiment is described with respect to an example in which the storage space forming member 4 is fixedly fastened to the wall of the case 3 by the fastening bolts 91. However, embodiments of the present invention are not limited to this. For example, it is also one of preferred embodiments of the present invention that the storage space forming member 4 includes a radially elastically deformable latch portion 92 (e.g., a snap-fit structure) as shown in FIG. 11, and the storage space forming member 4 is fixed in a hole formed in the wall (in this example, the intermediate wall) of the case 3, by inserting the latch portion 92 through the hole. This structure can simplify assembly of the storage space forming member 4.

Figure 12:
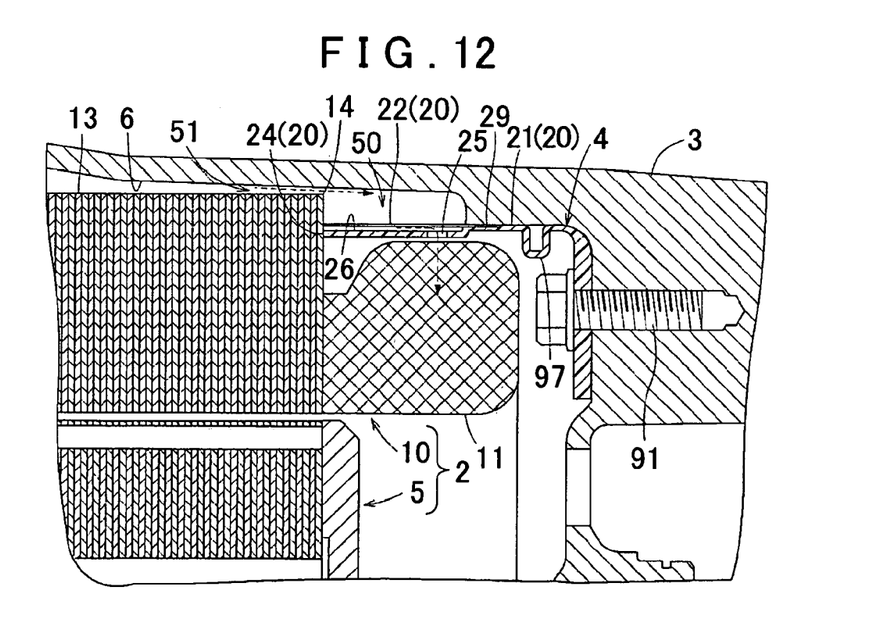
FIG. 12 is a partial cross-sectional view of a drive device according to a further embodiment of the present invention.

(6) The above embodiment is described with respect to an example in which the contact portion 20 of the storage space forming member 4 includes the fourth contact portion 24 that contacts the one axial end face of the stator core 13 to close the other axial side of the cooling medium storage space 50. In this structure, it is preferable that the storage space forming member 4 be axially elastically deformable, and a portion located on one axial side in the storage space forming member 4 be fixed to the case 3 in the state in which the fourth contact portion 24 located on the other axial side is in contact with the one axial end face of the stator core 13. For example, a structure shown in FIG. 12 can be implemented as such a structure. In the structure of FIG. 12, the storage space forming member 4 is axially elastically deformable by a bent portion 97, and in the state in which the stator core 13 is attached, the storage space forming member 4 is axially contracted from its natural state. Thus, the storage space forming member 4 is subjected to a restoring force acting to extend the storage space forming member 4 in the axial direction, whereby fluid-tightness of the contact portion between the fourth contact portion 24 and the stator core 13 can be increased by using the elastic force of the storage space forming member 4. Moreover, errors regarding the attached positions of the stator core 13 and the storage space forming member 4 can be absorbed by elastic deformation of the storage space forming member 4. Note that fluid-tightness of the first contact portion 21, the second contact portion 22, and the third contact portion 23 can be increased by forming a bent portion (the bent portion 97 or other bent portion) in the storage space forming member 4 so that a portion including the contact portion 20 is pressed radially outward in the state in which the storage space forming member 4 is fixed to the case 3.

(7) The above embodiment is described with respect to an example in which the plurality of cooling medium discharge openings 25 formed in the storage space forming member 4 have the same opening cross-sectional area. However, embodiments of the present invention are not limited to this, and it is also one of preferred embodiments of the present invention that the plurality of cooling medium discharge openings 25 have different opening cross-sectional areas from each other. In this structure, for example, the opening cross-sectional area of each cooling medium discharge opening 25 can be designed according to the amount of heat that is generated in a corresponding region of the coil end portion 11 to which the cooling medium is to be supplied. With this structure, a larger amount of cooling medium can be supplied to a high-temperature region of the coil end portion 11, whereby cooling efficiency of the coil end portion 11 can be increased.

(8) The above embodiment is described with respect to an example in which the storage space forming member 4 includes both the second contact portion 22 and the third contact portion 23. However, embodiments of the present invention are not limited to this, and it is also one of preferred embodiments of the present invention that the storage space forming member 4 includes only one of the second contact portion 22 and the third contact portion 23. In this case, although the cooling medium storage space 50 has an opening on one of the circumferential sides, the cooling medium can be supplied to the outer peripheral surface of the coil end portion 11 through the opening. In a structure in which the storage space forming member 4 includes neither the second contact portion 22 nor the third contact portion 23, the cooling medium storage space 50 is a space having openings formed on both circumferential sides, and the cooling medium can be supplied to the outer peripheral surface of the coil end portion 11 through the openings on both circumferential sides.

(9) The above embodiment is described with respect to an example in which the storage space forming member 4 has a circular arc shape as viewed in the axial direction of the coil end portion 11. However, embodiments of the present invention are not limited to this. For example, if the coil end portion 11 does not have a cylindrical shape, it is preferable that the shape of the storage space forming member 4 as viewed in the axial direction of the coil end portion 11 be changed as appropriate to a shape other than the circular arc shape, according to the shape of the outer peripheral surface of the coil end portion 11. In this case, unlike the above embodiment, the specific direction, namely the direction in which the storage space forming member 4 extends as viewed axially (as viewed from any of the sides of the axial direction), does not match the circumferential direction. The shape of the storage space forming member 4 as viewed in the axial direction of the coil end portion 11 may be changed to a shape that is irrelevant to that of the outer peripheral surface of the coil end portion 11. For example, the shape of the storage space forming member 4 as viewed in the axial direction of the coil end portion 11 may be a linear shape, a bent line shape, or the like.

(10) The above embodiment is described with respect to an example in which the storage space forming member 4 is formed to cover at least the uppermost portion of the coil end portion 11, and at least a part of the cooling medium storage space 50 is positioned above the uppermost portion of the coil end portion 11. However, embodiments of the present invention are not limited to this, and the storage space forming member 4 may be structured so as not to cover the uppermost portion of the coil end portion 11.

(11) The above embodiment is described with respect to an example in which the first contact portion 21 contacts the inner surface 6 of the case 3 along the entire circumferential width of the storage space forming member 4. However, embodiments of the present invention are not limited to this. The first contact portion 21 may partially not contact the inner surface 6 of the case 3, although the first contact portion 21 contacts the inner surface 6 of the case 3 to close the one axial side of the cooling medium storage space 50. In this case as well, a portion on the one axial side of the storage space forming member 4 is fixed to the case 3 by the fastening bolts 91, which reduces the possibility that the cooling medium introduced into the cooling medium introducing gap 51 may flow axially across the cooling medium storage space 50, and leak from the cooling medium storage space 50 to the one axial side. Similarly, a part of the second contact portion 22 or the third contact portion 23 in the axial direction of the storage space forming member 4 may be structured so as not to contact the inner surface of the case 3. Further, a part of the fourth contact portion 24 in the circumferential direction of the storage space forming member 4 may be structured so as not to contact the one axial end face of the stator core 13. That is, the present invention may be structured so that at least any of the first contact portion 21, the second contact portion 22, the third contact portion 23, and the fourth contact portion 24 closes, but does not block, a corresponding side of the cooling medium storage space 50.

(12) The above embodiment is described with respect to an example in which the peripheral wall of the case 3, which covers the rotating electrical machine 2 from radially outside, is formed so that the overall diameter of the peripheral wall decreases toward the one axial side. However, embodiments of the present invention are not limited to this, and it is also one of preferred embodiments of the present invention that the peripheral wall is formed so as to have a substantially uniform inner diameter along the axial direction, or the peripheral wall is formed so that the overall diameter of the peripheral wall increases toward the one axial side.

(13) The above embodiment is described with respect to an example in which the cooling medium discharge openings 25 have a circular cross section. However, embodiments of the present invention are not limited to this, and it is also one of preferred embodiments of the present invention that the cooling medium discharge openings 25 have a cross section other than the circular cross section (e.g., a polygonal cross section such as a rectangular cross section and an elliptical cross-section).

(14) The above embodiment is described with respect to an example in which the storage space forming member 4 has an L-shaped cross section as taken along the radial direction. However, embodiments of the present invention are not limited to this, and the cross-sectional shape of the storage space forming member 4 taken along the radial direction may be other shapes such as a linear shape.

(15) The above embodiment is described with respect to an example in which the storage space forming member 4 is made of an insulating material. However, embodiments of the present invention are not limited to this, and the storage space forming member 4 may be made of a material other than the insulating material, such as a metal.

(16) The above embodiment is described with respect to an example in which the cooling structure of the stator of the present invention is applied to the stator of the rotating electrical machine 2 included in the drive device 1 for vehicles. However, embodiments of the present invention are not limited to this. The cooling structure of the stator of the present invention may also be applied to stators of rotating electrical machines included in drive devices other than those for vehicles, and stators of rotating electrical machines included in devices other than the drive devices.

The present invention can be preferably used in cooling structures of stators, which include a case that accommodates a rotating electrical machine, and cools a coil end portion protruding from a stator core included in the stator of the rotating electrical machine toward one side in a stator axial direction by supplying a cooling medium from the other side in the stator axial direction toward a cooling medium introducing gap that is formed between the inner surface of the case and the outer peripheral edge of the one axial end face of the stator core.

What is claimed is:

1. A cooling structure of a stator, including a case that accommodates a rotating electrical machine, and cooling a coil end portion protruding from a stator core included in the stator of the rotating electrical machine toward one side in a stator axial direction by supplying a cooling medium from the other side in the stator axial direction toward a cooling medium introducing gap that is formed between an inner surface of the case and an outer peripheral edge of one axial end face of the stator core, wherein the cooling medium introducing gap is formed above a portion of the coil end portion to which the cooling medium is to be supplied, a storage space forming member is provided along an outer peripheral surface of the coil end portion, the storage space forming member forming a cooling medium storage space with the inner surface of the case therebetween so that the cooling medium introducing gap opens in the cooling medium storage space on the other side thereof in the stator axial direction, and the storage space forming member has a contact portion having a first contact portion that contacts the inner surface of the case to close the cooling medium storage space on the one side in the stator axial direction, and a cooling medium discharge opening for supplying the cooling medium introduced into the cooling medium storage space to the coil end portion.

2. The cooling structure of the stator according to claim 1, wherein the storage space forming member is formed so as to cover at least an uppermost portion of the coil end portion, and at least a part of the cooling medium storage space is positioned above the uppermost portion of the coil end portion.

3. The cooling structure of the stator according to claim 1, wherein the coil end portion is formed in a cylindrical shape with a central axis of the coil end portion extending in the stator axial direction, and the storage space forming member is formed in a circular arc shape as viewed from an axial direction of the coil end portion, and is positioned along the outer peripheral surface of the coil end portion.

4. The cooling structure of the stator according to claim 3, wherein the storage space forming member includes a plurality of the cooling medium discharge openings, and the plurality of cooling medium discharge openings are dispersed along a stator circumferential direction.

5. The cooling structure of the stator according to claim 4, wherein groove-like recessed portions, which extend in the stator axial direction, are formed at circumferential positions where the cooling medium discharge openings are formed in an upper surface of the storage space forming member.

6. The cooling structure of the stator according to claim 1, wherein a direction in which the storage space forming member extends as viewed from the one side in the stator axial direction is defined as a specific direction, and the contact portion of the storage space forming member includes at least one of a second contact portion that contacts the inner surface of the case to close the cooling medium storage space on one side in the specific direction, and a third contact portion that contacts the inner surface of the case to close the cooling medium storage space on the other side in the specific direction.

7. The cooling structure of the stator according to claim 1, wherein the contact portion of the storage space forming member includes a fourth contact portion that contacts the one axial end face of the stator core to close the cooling medium storage space on the other side in the stator axial direction.

8. The cooling structure of the stator according to claim 7, wherein
the storage space forming member is elastically deformable in the stator axial direction, and a portion of the storage space forming member on the one side in the stator axial direction is fixed to the case in a state in which the fourth contact portion located on the other side in the stator axial direction is in contact with the one axial end face of the stator core.

9. The cooling structure of the stator according to 1, wherein
a contact surface portion of the contact portion is made of a soft material having a lower hardness than a material that forms a portion other than the contact surface portion in the storage space forming member.

10. The cooling structure of the stator according to claim 1, wherein
the storage space forming member is made of an insulating material.

11. The cooling structure of the stator according to claim 2, wherein
the coil end portion is formed in a cylindrical shape with a central axis of the coil end portion extending in the stator axial direction, and
the storage space forming member is formed in a circular arc shape as viewed from an axial direction of the coil end portion, and is positioned along the outer peripheral surface of the coil end portion.

12. The cooling structure of the stator according to claim 11, wherein
the storage space forming member includes a plurality of the cooling medium discharge openings, and the plurality of cooling medium discharge openings are dispersed along a stator circumferential direction.

13. The cooling structure of the stator according to claim 12, wherein
groove-like recessed portions, which extend in the stator axial direction, are formed at circumferential positions where the cooling medium discharge openings are formed in an upper surface of the storage space forming member.

14. The cooling structure of the stator according to claim 2, wherein
a direction in which the storage space forming member extends as viewed from the one side in the stator axial direction is defined as a specific direction, and
the contact portion of the storage space forming member includes at least one of a second contact portion that contacts the inner surface of the case to close the cooling medium storage space on one side in the specific direction, and a third contact portion that contacts the inner surface of the case to close the cooling medium storage space on the other side in the specific direction.

15. The cooling structure of the stator according to claim 3, wherein
a direction in which the storage space forming member extends as viewed from the one side in the stator axial direction is defined as a specific direction, and
the contact portion of the storage space forming member includes at least one of a second contact portion that contacts the inner surface of the case to close the cooling medium storage space on one side in the specific direction, and a third contact portion that contacts the inner surface of the case to close the cooling medium storage space on the other side in the specific direction.

16. The cooling structure of the stator according to claim 4, wherein
a direction in which the storage space forming member extends as viewed from the one side in the stator axial direction is defined as a specific direction, and
the contact portion of the storage space forming member includes at least one of a second contact portion that contacts the inner surface of the case to close the cooling medium storage space on one side in the specific direction, and a third contact portion that contacts the inner surface of the case to close the cooling medium storage space on the other side in the specific direction.

17. The cooling structure of the stator according to claim 5, wherein
a direction in which the storage space forming member extends as viewed from the one side in the stator axial direction is defined as a specific direction, and
the contact portion of the storage space forming member includes at least one of a second contact portion that contacts the inner surface of the case to close the cooling medium storage space on one side in the specific direction, and a third contact portion that contacts the inner surface of the case to close the cooling medium storage space on the other side in the specific direction.

18. The cooling structure of the stator according to claim 2, wherein
the contact portion of the storage space forming member includes a fourth contact portion that contacts the one axial end face of the stator core to close the cooling medium storage space on the other side in the stator axial direction.

19. The cooling structure of the stator according to claim 3, wherein
the contact portion of the storage space forming member includes a fourth contact portion that contacts the one axial end face of the stator core to close the cooling medium storage space on the other side in the stator axial direction.

20. The cooling structure of the stator according to claim 11, wherein
the contact portion of the storage space forming member includes a fourth contact portion that contacts the one axial end face of the stator core to close the cooling medium storage space on the other side in the stator axial direction.

* * * * *